United States Patent
Harper et al.

(10) Patent No.: US 7,745,497 B2
(45) Date of Patent: *Jun. 29, 2010

(54) ELECTROSTATIC AEROSOL COMPOSITIONS

(75) Inventors: Duncan Roger Harper, Nottingham (GB); Neale Harrison, Burton-on-Trent (GB); John Douglas Morgan, Carlingford (AU); John Howard Clint, Beverley (GB); Mario Abela, Quakers Hill (AU)

(73) Assignees: Reckitt Benckiser (UK) Limited, Slough (GB); Reckitt Benckiser (Australia) Pty Limited, West Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/091,284

(22) Filed: Mar. 5, 2002

(65) Prior Publication Data

US 2003/0096878 A1    May 22, 2003

Related U.S. Application Data

(63) Continuation of application No. PCT/GB00/03426, filed on Sep. 5, 2000, now abandoned.

(30) Foreign Application Priority Data

Sep. 7, 1999    (GB) ................... 9921037.9

(51) Int. Cl.
| | |
|---|---|
| C09K 3/30 | (2006.01) |
| B01F 3/08 | (2006.01) |
| A61K 9/12 | (2006.01) |
| B05B 5/00 | (2006.01) |
| A01N 25/06 | (2006.01) |

(52) U.S. Cl. ............. 516/8.1; 516/29; 516/76; 424/45; 239/708; 504/364; 222/635

(58) Field of Classification Search .......... 516/8.1, 516/76, 29; 424/45; 239/708; 222/635; 504/364, 690.1

See application file for complete search history.

(56) References Cited

U.S. PATENT DOCUMENTS

| 2,524,590 | A | * | 10/1950 | Boe | |
|---|---|---|---|---|---|
| 2,819,996 | A | * | 1/1958 | Riley | 516/76 X |
| 4,350,605 | A | | 9/1982 | Hughett | 516/7 |
| 4,536,323 | A | * | 8/1985 | Stopper | |
| 4,613,646 | A | | 9/1986 | Sandvick | 524/476 |
| 5,560,544 | A | | 10/1996 | Merritt et al. | 239/104 |
| 5,849,264 | A | * | 12/1998 | Bassam et al. | 424/45 |
| 5,945,111 | A | * | 8/1999 | Esser | 424/45 X |
| 6,199,766 | B1 | * | 3/2001 | Fox et al. | 239/708 X |
| 6,279,834 | B1 | * | 8/2001 | Fox et al. | 239/708 X |
| 6,482,357 | B1 | * | 11/2002 | Fox et al. | 422/4 |
| 6,592,813 | B1 | * | 7/2003 | Fox et al. | 424/45 X |
| 6,612,510 | B1 | * | 9/2003 | Fox et al. | 239/690.1 |
| 2007/0093558 | A1 | * | 4/2007 | Harper et al. | 516/8.1 |

FOREIGN PATENT DOCUMENTS

| GB | 1445813 | | 8/1976 |
|---|---|---|---|
| WO | WO 97/28883 A1 | | 8/1997 |
| WO | WO 99/01227 A1 | | 1/1999 |
| WO | WO99/21659 | * | 5/1999 |
| WO | WO 00/01422 | * | 1/2000 |
| WO | WO 00/01494 A1 | | 1/2000 |

* cited by examiner

*Primary Examiner*—Daniel S Metzmaier
(74) *Attorney, Agent, or Firm*—Fish & Richardson P.C.

(57) ABSTRACT

An electrically neutral composition in the form of a water-in-oil or an oil-in-water emulsion is imparted with a unipolar electrostatic charge on spraying from an aerosol spray device by incorporating into the composition a non-ionic surfactant and at least one polar or ionic or aromatic or linearly conjugated compound. The amount of the polar or ionic or aromatic or linearly conjugated compound included in the composition is about 0.01 to about 80% w/w based on the non-ionic surfactant, but is such that the theoretical conductivity of the emulsion is less than the bulk conductivity of the emulsion.

12 Claims, 1 Drawing Sheet

ELECTROSTATIC AEROSOL COMPOSITIONS

CROSS-REFERENCE TO RELATED APPLICATIONS

This application is a continuation of International Application No. PCT/GB00/03426, filed Sep. 5, 2000, now abandoned, which was published in the English language on Mar. 15, 2001, under International Publication No. WO 01/18145 A2, and the disclosure of which is incorporated herein by reference.

BACKGROUND OF THE INVENTION

The present invention relates to aerosol compositions and, in particular, compositions in which the droplets are imparted with an electrostatic charge on spraying from an aerosol spray device and in which the electrostatic charge on the droplets is maximized through the inclusion in the compositions of certain selected components.

Aerosol spray devices are a convenient form in which a variety of useful products, such as insecticides, air fresheners, antiperspirants, hair sprays, horticultural products, waxes and polishes, oven cleaners, starches and fabric finishes, shoe and leather care products, glass cleaners and various other household, institutional, professional or industrial products, can be dispensed.

The utility of aerosol spray devices resides in the ability to readily deliver the composition contained within the device in the form of fine droplets to the target area, for example the spraying of an insecticide onto target insects.

In International Patent Publication No. WO 97/28883 there is described a method of precipitating airborne particles from air in a domestic environment containing such particles in which the air to be treated is sprayed with liquid droplets from an aerosol spray device with a unipolar charge being imparted to the droplets during the spraying of the liquid droplets by the aerosol spray device, the unipolar charge being at a level such that the droplets have a charge to mass ratio of at least $+/-1 \times 10^{-4}$ C/kg.

In International Patent Publication No. WO 99/01227 there is described a method of killing flying insects by spraying into the air in which the insects are flying liquid droplets of an insecticidal composition, a unipolar charge being imparted to the liquid droplets by double layer charging and charge separation during spraying, the unipolar charge being at a level such that the said liquid droplets have a charge to mass ratio of at least $+/-1 \times 10^{-4}$ C/kg. An apparatus for imparting the unipolar charge of this magnitude to a liquid composition is also described.

BRIEF SUMMARY OF THE INVENTION

We have now found that by careful selection of the components which are to be contained within a liquid composition for application by aerosol spraying, it is possible to charge the liquid droplets during the spraying operation without requiring any special features of the construction of the aerosol spraying head.

Accordingly, in one aspect the present invention provides an electrically neutral composition in the form of a water-in-oil or an oil-in-water emulsion, in which droplets of the emulsion on discharge from an aerosol spray device are imparted with a unipolar electrostatic charge, which composition comprises:

(a) at least one propellant in an amount of about 2 to about 80% w/w;
(b) at least one non-ionic surfactant in an amount of about 0.01 to about 10% w/w;
(c) optionally one or more oils or solvents, preferably aliphatic, linearly conjugated or aromatic, within the oil phase of the emulsion in an amount of up to about 80% w/w, preferably up to about 40% w/w;
(d) at least one polar or ionic or aromatic or conjugated compound in an amount of about 0.01 to 80% w/w based on the non-ionic surfactant, but which is such that the theoretical conductivity of the emulsion is less than the bulk conductivity of the emulsion; and
(e) water.

In a second aspect the present invention provides a method of enhancing the unipolar charge which is imparted to droplets of an emulsion on discharge from an aerosol spray device in which the droplets are formed from an oil-in-water or a water-in-oil emulsion composition which comprises:

(a) at least one propellant in an amount of about 2 to about 80% w/w;
(b) at least one non-ionic surfactant in an amount of about 0.01 to about 10% w/w;
(c) optionally one or more oils or solvents, preferably aliphatic, linearly conjugated or aromatic, within the oil phase of the emulsion in an amount of up to about 80% w/w. preferably up to about 40% w/w;
(d) at least one polar or ionic or aromatic or linearly conjugated compound in an amount of about 0.1 to about 80% w/w based on the non-ionic surfactant, but which is such that the theoretical conductivity of the emulsion is less than the bulk conductivity of the emulsion; and
(e) water.

In a third aspect the present invention provides the use of a non-ionic surfactant and at least one polar or ionic or aromatic or conjugated compound in an amount of about 0.01 to about 80% w/w based on the non-ionic surfactant to enhance the electrostatic charge imparted to droplets of a composition in the form of a water-in-oil or an oil-in-water emulsion on discharge from an aerosol spray device, which composition includes:

(a) at least one propellant in an amount of about 2 to about 80% w/w;
(b) optionally one or more oils or solvents, preferably aliphatic, linearly conjugated or aromatic, within the oil phase in an amount of up to about 80% w/w, preferably up to about 40% w/w; and
(c) water;

and the amount of the polar or ionic or aromatic or conjugated compound being such that the theoretical conductivity of the emulsion is less than the bulk conductivity of the emulsion.

In a fourth aspect the present invention provides an aerosol spray which contains an electrically neutral composition in the form of a water-in-oil emulsion, an oil-in-water emulsion or a single phase composition, in which liquid droplets of the composition on discharge from the aerosol spray device are imparted with a unipolar electrostatic charge, wherein the formulation of the composition and the material of the portion of the aerosol spray device with which the liquid comes into contact on spraying are selected such that i) the difference in surface energies between the Lewis base component of the liquid and the Lewis base component of the material with which the liquid comes into contact on spraying is at least about $\pm 2$ mJ m$^{-2}$; and/or ii) the difference in surface energies between the Lewis acid component of the liquid and the Lewis acid component of the material with which the liquid comes into contact on spraying is at least about ±0.5 mJ m$^{-2}$.

The liquid droplets preferably have a charge to mass ratio of at least about +/−1×10$^{-4}$ C/kg, more preferably at least about +/−2×10$^{-4}$ C/kg. The higher the charge to mass ratio of the liquid droplets, the more effective the liquid droplets will be for their intended use, such as precipitating airborne particles and targeting insects. This charge level is considerably higher than the charge level which is achieved when spraying conventional liquid formulations from conventional aerosol spray devices, where charge levels are obtained of the order of about +/−1×10$^{-5}$ to about +/−1×10$^{-8}$ C/kg.

In the formulations of the present invention it is the combination of components (b) and (d) of the emulsion which improves the electron transfer through the emulsion with the charge being transferred from droplet to droplet through the emulsion at the interface between the disperse phase and the continuous phase. Preferably, at least about 90% by volume of the droplets of the disperse phase within the emulsion have an average diameter of less than about 60 μm, and more preferably in a range of about 20 to about 40 μm.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings a measuring embodiment which is presently preferred. It should be understood, however, that the invention is not limited to the precise arrangements and instrumentalities shown. In the drawings:

FIG. 1b is a sectional view of the valve insert of FIG. 1a; and

FIG. 1c is an inverted plan view of the valve insert of FIG. 1a.

DETAILED DESCRIPTION OF THE INVENTION

Figure 1A:
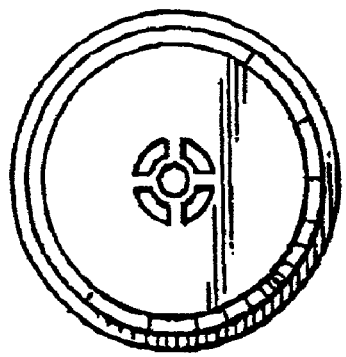
FIG. 1a is a plan view of a valve insert of a standard aerosol can used to measure the charge to mass ratio of the compositions of the invention.

The various components (a) to (e) of the compositions of the present invention are discussed in turn below:

Propellants

One or more propellants are used in the composition of the invention in a total amount of about 2 to about 80% w/w. Among the propellants that may be used are hydrocarbons and compressed gas, of which hydrocarbons are preferred.

Hydrocarbon propellants which may be used are acetylene, methane, ethane, ethylene, propane, n-butane, n-butene, isobutane, isobutene, pentane, pentene, isopentane and isopentene. Mixtures of these propellants may also be used. Commercially available propellants typically contain a number of hydrocarbon gases. For example, an odorized, commercial butane contains predominantly n-butane and some iso-butane together with small amounts of propane, propene, pentane and butene.

Preferred hydrocarbon propellants include propane, n-butane, isobutane, pentane and isopentane, while the most preferred are propane, iso-butane and n-butane. Particularly preferred hydrocarbon propellants are mixtures of propane, n-butane and iso-butane.

While broadly the concentration of hydrocarbon propellant will be about 2 to about 80% w/w, generally the concentration will be about 10 to about 60% w/w, preferably about 25 to about 60% w/w, and most preferably about 40% w/w.

When compressed gases are used as a propellant, these will generally be carbon dioxide, nitrogen or air. Usually, they will be used at a concentration of about 2 to about 20% w/w, preferably about 5% w/w.

Non-Ionic Surfactants

Non-ionic surfactants for use in the present invention include mono, di and tri sorbitan esters, polyoxyethylene mono, di and tri sorbitan esters; mono and polyglyceryl esters; alkoxylated alcohols; alkoxylated amines; alkoxylated acids; amine oxides; ethoxylated/proproxylated block copolymers; alkoxylated alkanolamides; and alkoxylated alkyl phenols.

Particularly preferred are those surfactants which contain at least one alkyl, allyl or substituted phenyl group containing at least one $C_6$ to $C_{22}$ carbon chain. Examples are esters with $C_{10}$-$C_{22}$ fatty acids, preferably $C_{12}$-$C_{18}$ fatty acids, particularly polyglycerol oleate and ethoxylated fatty alcohols, such as oleyl alcohol ethoxylated with two moles of ethylene oxide. Further examples are the polyethylene glycol oleates, such as PEG-4 oleate, PEG-8 oleate and PEG-12 oleate.

In some instances, the non-ionic surfactant may itself be combined with component (d). For example, when the non-ionic surfactant is polyglycerol oleate, the surfactant may contain small quantities of sodium or potassium oleates as impurities as a by-product of manufacture, for example in an amount of about 0.01 to about 1% by weight. Greater quantities of such ionic compounds are generally not desirable and may result in the compositions not fulfilling the conductivity requirements of the compositions of the invention.

The concentration of the non-ionic surfactant is about 0.01 to about 10% w/w, preferably about 0.01 to about 1% w/w.

Polar, Ionic, Aromatic or Conjugated Compounds

The polar or ionic or aromatic or conjugated compound which is included as component (d) in the compositions of the present invention is preferably a compound which is attracted to the interface between the disperse phase and the continuous phase and may be selected from:

a) alkali metal salts, alkaline earth metal salts, ammonium salts, amine salts or amino alcohol salts of one or more of the following compounds: alkyl sulphates, alkyl ether sulphates, alkylamidoether sulphates, alkylarylpolyether sulphates, monoglyceride sulphates, polyglyceride sulphates, alkyl sulphonates, alkylamine sulphonates, alkyl-aryl sulphonates, olefin sulphonates, paraffin sulphonates, alkyl sulpho-succinates, alkylether sulphosuccinates, alkylamide sulphosuccinates, alkyl sulphocinnamates, alkyl sulphoacetates, alkyl phosphates, alkylether phosphates, acyl sarcosinates, acyl isothionates and N-acyl taurates;

b) alkyl amidopropylbetaines, alkylamido-betaines, alkylamidosulphobetaines, alkylbetaines, aminimides, quaternary ammonium compounds and quaternary phosphonium compounds;

c) carboxylic acids, carboxylic acid salts, esters, ketones, aldehydes, amides or amines of carboxylic acids containing from 6 to 30 carbon atoms;

d) diethyl orthophthalate, methylphenylcarbinyl acetate, α-methyl ionone, 4-hydroxy 3-methoxy-benzaldehyde, phenylethyl alcohol, dipropylene glycol, styryl acetate, n-butyl benzoate, isopropyl 4-hydroxybenzoate, isobutyl acetophenone, isopropyl acetophenone, nicotinic acid, benzoic acid, 2-naphthol, neopentyl benzene, naphthalene, toluene, fullerene, tannic acid, t-butylacetophenone, isopropylcinnamte, resorcinol, 4-methoxycinnam-aldehyde, arbutin, 4-acetoxy-3-methoxycinnamaldehyde, 4-isopropylphenol, trans-stilbene, esculetin, p-chloro-m-xylenol, chloro-o-cresol, triclosan, norfenefrine, norepinephrine, hexyl-resorcinol, limonene, methylphenylcarbinyl acetate, and p-tert-butyl-α-methylhydrocinnamic aldehyde.

Particularly preferred compounds in group (b) are alkyldimethylbenzyl ammonium chloride, octyltimethyl ammonium bromide, cetyltrimethylammonium bromide and dodecyltrimethylphosphonium bromide.

Particularly preferred compounds in group (c) are lauric, oleic, palmitic, ricinoleic and stearic acids, or the salts, amides, esters, ketones or aldehydes thereof.

It will be understood that certain of the aromatic or conjugated compounds may also be classed as fragrances.

The concentration of component (d) is about 0.01 to about 80% w/w, preferably about 0.01 to about 30%, more preferably about 0.01 to about 10% w/w based on the non-ionic surfactant, component (b). The amount of component (d) is selected so that the bulk conductivity is greater than the theoretical conductivity. In some cases, too great an amount of component (d) can result in the composition not fulfilling the conductivity requirement of the compositions of the invention.

It will be understood that mixtures of compounds may be used as component (d). In particular it has been found that the addition of an aromatic compound together with an ionic compound increases the charge to mass ratio of the formulations on spraying.

Oils or Solvents

One or more oils or solvents may be incorporated in the compositions of the invention in an amount of up to about 80% w/w, preferably up to about 40% w/w. Generally, the solvent will be water immiscible. A wide range of oils or solvent materials may be used, although care should be exercised to ensure that the solvent does not adversely interact with any active components of the compositions of the invention, such as insecticides.

Examples of solvents that may be used in the compositions of the invention include:

Liquid n-paraffins, liquid isoparaffins, cycloalkanes, naphthene-containing solvents, white spirit, kerosene, ester solvents, silicone solvents or oils, fatty acids, dialkyl phthalates, $C_5$-$C_{11}$ alcohols and fatty alcohols. Specific examples of these are as follows: liquid n-paraffins: Norpar 12, Norpar 13 and Norpar 15 (available from Exxon); liquid isoparaffins: Isopar G, Isopar H, Isopar L, Isopar M and Isopar V (available from Exxon).

Naphthene-containing solvents: Exxsol D40, Exxsol D60, Exxsol D80, Exxsol D100, Exxsol D10, Nappar 10, Solvesol 100, Solvesol 150, Solvesol 200 (available from Exxon).

Ester solvents: such as alkyl acetates, examples being Exxate 1000, Exxate 1300 (available from Exxon), and Coasol (available from Chemoxy International);

Silicone solvent oils: Dow Corning 244, 245, 344 and 345 fluids; and

Fatty alcohols: octanol, dodecanol, lauryl alcohol, myristyl alcohol, cetyl alcohol, stearyl alcohol, cetostearyl alcohol, oleyl alcohol.

Preferred solvents are liquid hydrocarbon solvents, n-paraffins, and iso-paraffins.

Although the solvent is preferably incorporated at a level of about 1 to about 20% w/w, more preferably the concentration will be in the range of about 2 to about 10% w/w, most preferably about 5% w/w.

Insecticidal Compositions

In one preferred agent of the present invention the compositions are insecticidal compositions which contain about 0.001 to about 5% w/w of an insecticidal compound. A wide range of active ingredients may be used of which pyrethroids, particularly synthetic pyrethroids, chlorpyrifos, propoxur, and diazinon are preferred.

When synthetic pyrethroids, such as lambda cyhalothrin and bioresmethrin are used, generally they will be incorporated in concentrations of about 0.02% w/w or above. Other synthetic pyrethroids, such as cypermethrin, tetramethrin, permethrin, and bioallethrin, will usually be incorporated to give a concentration of about 0.2% to about 0.5% w/w, or above.

Chloropyrifos, propoxur and diazinion will generally be incorporated to give a concentration in a range of about 0.5 to about 0.9% w/w.

Preferably, insecticidal compositions of the invention will include an insecticide which functions primarily to knock down an insect, together with a second insecticide which functions primarily as a kill agent. An example of such a combination is the use of permethrin as a kill agent in a combination with tetramethrin as a knock down agent.

Optional Ingredients

Various optional ingredients may be incorporated into the compositions of the present invention. For example, in order to maximize the effectiveness of the insecticidal activity of the compositions of the invention, synergists such as N-octylbicycloheptene dicarboximide and piperonyl butoxide may be included at a concentration of about 0.5 to about 1.5% w/w, most preferably about 1.0% w/w, for use in conjunction with pyrethroid insecticides.

In addition, other ingredients including corrosion inhibitors, such as 1-hydroxyethyl-2-heptadecenyl imidazoline and/or sodium benzoate, preferably in a concentration about 0.01 to about 0.5% w/w, and preservatives and antioxidants, such as butylated hydroxytoluene, may be used as required. One or more fragrance components may also be included, according to the particular consumer requirements. It will be understood that certain fragrance components are components which may comprise component (d) of the compositions of the present invention, and in this instance, such a component is not an optional ingredient.

Lewis Acid and Lewis Base Characteristics

In relation to the fourth embodiment of the invention an aerosol spray device and the electrically neutral composition contained therein have certain Lewis acid and Lewis base characteristics which assist in imparting a unipolar charge to the liquid.

When two substances are brought together and then separated, an electrical charge is transferred from one to the other. This can occur for solid-solid separations, for solid-liquid separations and for liquid-liquid separations. When one of the components becomes airborne, the electrical charge can remain on the substance for a significant length of time as there is no place to ground the charge. The ability of substances to transfer their charge can be related to the characteristic Lewis acid ($\gamma^+$) and Lewis base ($\gamma^-$) values for the substance. All substances have characteristic values and these can be calculated indirectly from their component surface energies.

These surface energies when combined with a London-van der Waals component ($\gamma^{LW}$) form what is known as the surface tension. This is easiest to measure at the interface between a drop of liquid on a solid substrate.

This equation used for these calculations comes from the approach used by Good and van Oss:

$$(1+\cos\theta)\gamma L = 2[\surd(\gamma s^{LW}\gamma L^{LW}) + \surd(\gamma s^{+}\gamma L^{-}) + \surd(\gamma s^{-}\gamma L^{+})]$$

Where
  $\theta$ is the contact angle that a drop of liquid makes with the surface.
  $\gamma s$ is the energy component for the solid.
  $\gamma L$ is the energy component for the liquid.
  $\gamma^{LW}$ represents the London-van der Waals component.
  $\gamma^{+}$ is the Lewis acid component (electron acceptor).
  $\gamma^{-}$ is the Lewis base component (electron donor).

Using three or more test liquids whose characteristics are known, it is possible to solve this equation for the three unknowns, $\gamma s^{LW}$, $\gamma s^{+}$ and $\gamma s^{-}$. By using test solids whose characteristics are known, it is also possible to solve this equation to find the three unknown liquid surface energies. Thus, it is possible to characterize a series of solids and liquids to form a series of $\gamma^{+}$ and $\gamma^{-}$ values. In the case of solids this series matches that of the triboelectric series. Below is a non-exclusive list of solid substances that form part of this triboelectric series. The values are scaled such that water has a $\gamma^{-}$ and $\gamma^{+}$ of 25 mJ m$^{-2}$. The top of the list tends to become positive, when separated from a substance at the bottom of the list, which would become negative.

| Surface | $\gamma^{-}$ (mJ m$^{-2}$) |
|---|---|
| +Glass | 16 |
| Acetal 900P NC-10 | 15 |
| Celluloid | 13.8 |
| PMMA | 12 |
| Nylon | 11.3 |
| PVC | 8.4 |
| Polyester 2002-2 | 5 |
| Polyethylene | 0.1 |
| Polypropylene | 0.04 |
| −PTFE | 0 |

Liquids also have a value of $\gamma^{-}$ and $\gamma^{+}$ that can be measured. When liquids contact a solid of known $\gamma^{-}$ and $\gamma^{+}$ on aerosol spraying, and the $\gamma^{-}$ of the liquid is greater than or less than that of the solid by about 2 mJ m$^{-2}$, preferably by about 5 mJ m$^{-2}$, most preferably about 15 mJ m$^{-2}$, or a $\gamma^{+}$ greater than or less than that of the solid by about 0.5 mJ m$^{-2}$, preferably about 1 mJ m$^{-2}$, most preferably about 2 mJ m$^{-2}$, the liquid has a tendency to charge to about +/−1×10$^{-4}$ C/kg. A common material from which inserts for aerosol actuators are made is Acetal 900P NC-10, which has a $\gamma^{-}$ of about 15 mJ m$^{-2}$.

Aerosol Spray Devices

The compositions of the present invention, when sprayed through conventional aerosol spray heads, form into droplets which are imparted with a unipolar charge of at least about +/−1×10$^{-4}$ C/kg.

It is possible to impart even higher charges to the liquid droplets by choosing aspects of the aerosol device including the material, shape and dimensions of the actuator, the actuator insert, the valve and the dip tube and the characteristics of the liquid which is to be sprayed, so that the required level of charge is generated as the liquid is dispersed as droplets. A number of characteristics of the aerosol system increase double layer charging and charge exchange between the liquid formulation and the surface of the aerosol system. Such increases are brought about by factors which may increase the turbulence of the flow through the system, and increase the frequency and velocity of contact between the liquid and the internal surface of the container and valve and actuator system.

By way of example, characteristics of the actuator can be optimized to increase the charge levels on the liquid sprayed from the container. A smaller orifice in the actuator insert, of a size of about 0.45 mm or less, increases the charge levels of the liquid sprayed through the actuator. The choice of material for the actuator can also increase the charge levels on the liquid sprayed from the device with materials such as nylon, polyester, acetal, PVC, and polypropylene, tending to increase the charge levels. The geometry of the orifice in the insert can be optimized to increase the charge levels on the liquid as it is sprayed through the actuator. Inserts which promote the mechanical break-up of the liquid give better charging. The actuator insert of the spray device may be formed from a conducting, insulating, semi-conducting or static-dissipative material.

The characteristics of the dip tube can be optimized to increase charge levels in the liquid sprayed from the container. A narrow dip tube, of for example about 1.27 mm internal diameter, increases the charge levels on the liquid, and the dip tube material can also be changed to increase charge.

Valve characteristics can be selected which increase the charge to mass ratio of the liquid product as it is sprayed from the container. A small tailpiece orifice in the housing, of about 0.65 mm, increases the charge to mass ratio during spraying. A reduced number of holes in the stem, for example 2×0.50 mm, also increases the charge during spray. The presence of a vapor phase tap helps to maximize the charge levels, a larger orifice vapor phase tap of, for example, about 0.50 mm to about 1.0 mm generally giving higher charge levels.

The liquid droplets sprayed from the aerosol spray device will generally have diameters in the range of about 5 to about 100 micrometers, with a peak of droplets of about 40 micrometers.

Preparation

The compositions of the present invention may be prepared by standard techniques which are well known in the art. For example, components (b) to (d) may be mixed together to form the solvent phase. This solvent phase is then mixed with water to produce an emulsified concentrate which is then filled into cans and blended with the propellant. Alternatively, the concentrate and the propellant may be filled into the cans simultaneously.

Conductivity

The theoretical conductivity of an emulsion, a, can be calculated from measurements of the actual conductivity of the external phase and the internal phase, according to the following equation:

$$\sigma = \sigma_c(1+3\phi(\sigma_p-\sigma_c)/(\sigma_p+2\sigma_c))$$

where
  $\sigma$=theoretical conductivity of the emulsion
  $\sigma_c$=measured conductivity of the separated external phase
  $\sigma_p$=measured conductivity of the separated internal phase
  $\phi$=volume fraction of the internal phase.

The bulk conductivity can be determined by experimentation. Component (d) of the compositions of the present invention serves to enhance the actual conductivity of the emulsion, and thus the bulk conductivity of the emulsion is higher than the theoretical conductivity calculated according to the above formula. Preferably, the difference between the theoretical conductivity of the emulsion and the actual (measured) bulk conductivity of the emulsion is at least about +0.5 μS cm$^{-4}$, preferably at least about +4 μS cm$^{-1}$, more preferably at least about +6 μS cm$^{-1}$. Component (d) in the compositions of the present invention thus improves the electron transfer through the emulsion with the charge being transferred from droplet to droplet through the emulsion at the interface between the disperse phase and the continuous phase.

The present invention will be further described with reference to the following specific, non-limiting Examples.

Method for Predicting the Theoretical Conductivity of an Emulsion Through the Measurement of the Conductivity of the Individual Phases:
1. Calibrate the conductivity cell by measuring a solution of known conductivity. The conductivity cell comprises a pair of platinum electrodes, held apart and attached to the inside of a glass tube of approximately 1 cm internal diameter.
2. Using the same cell, measure the conductivity of the bulk emulsion according to the invention, while ensuring that the emulsion is static and homogeneous prior to taking the measurement.
3. Determine whether the continuous phase of the emulsion is water or oil.
4. Separate the two phases of the emulsion by either gravimetric or centrifugal separation. Isolate the phases and measure the conductivity of each phase in the calibrated cell.
5. Use the equation given below to determine the theoretical conductivity of the bulk emulsion.
6. The difference between the theoretical conductivity and that obtained directly from the measurements is the contribution to the bulk conductivity due to the emulsion droplets.

$$\sigma = \sigma_c(1 + 3\phi(\sigma_p - \sigma_c)/(\sigma_p + 2\sigma_c))$$

where
$\sigma$ = theoretical conductivity of the emulsion
$\sigma_c$ = measured conductivity of the separated external phase
$\sigma_p$ = measured conductivity of the separated internal phase
$\phi$ = volume fraction of the internal phase.

Measurement of Electrostatic Charge

Figure 1B:
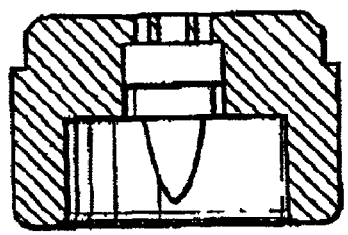
Figure 1C:
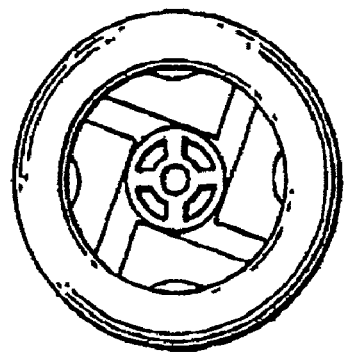

The charge to mass ratio of the compositions of Examples 4 to 50 was measured using a standard aerosol can with a valve insert made from polyoxymethylene according to the design shown in accompanying FIGS. 1a, 1b and 1c.

Example 1 (Comparative)

An emulsion was prepared from the following ingredients:

| Ingredient | % |
|---|---|
| Ethoxylated (7EO) alcohol (C$_{12}$-C$_{15}$) | 0.24 w/v |
| Deionized water | 47 v/v |
| Decane | 55 v/v |
| Actual (measured) conductivity of the bulk emulsion | 7.4 μS cm$^{-1}$ |
| $\sigma_c$ | 16.6 μS cm$^{-1}$ |
| $\sigma_p$ | 4.1 μS cm$^{-1}$ |
| Assuming $\phi$ = | 0.5 |
| $\sigma$ | 8.2 μS cm$^{-1}$ |

Difference (conductivity due the emulsion droplets)=7.4−8.2=−0.8 μS cm$^{-1}$.

This composition did not contain any component (d) and as can be seen the bulk conductivity of the emulsion is less than the theoretical value.

Example 2

An emulsion was prepared from the following ingredients:

| Ingredient | % |
|---|---|
| Ethoxylated (7EO) alcohol (C$_{12}$-C$_{15}$) | 0.24 w/v |
| Sodium lauryl sulphate (30% active) | 3% w/w of the non-ionic surfactant |
| Deionized water | 47 v/v |
| Decane | 53 v/v |
| Actual (measured) conductivity of the bulk emulsion | 22.3 μS cm$^{-1}$ |
| $\sigma_c$ | 39.4 μS cm$^{-1}$ |
| $\sigma_p$ | 4.0 μS cm$^{-1}$ |
| Assuming $\phi$ = | 0.5 |
| $\sigma$ | 14.1 μS cm$^{-1}$ |

Difference (conductivity due the emulsion droplets)= 22.3−14.1=8.2 μS cm$^{-1}$.

Example 3 (Comparative)

An emulsion was prepared from the following ingredients:

| Ingredient | % |
|---|---|
| Ethoxylated (7EO) alcohol (C$_{12}$-C$_{15}$) | 0.24 w/v |
| Sodium lauryl sulphate (30% active) | 6% w/w of the non-ionic surfactant |
| Deionized water | 47 v/v |
| Decane | 53 v/v |
| Actual (measured) conductivity of the bulk emulsion | 23.3 μS cm$^{-1}$ |
| $\sigma_c$ | 83.0 μS cm$^{-1}$ |
| $\sigma_p$ | 9.0 μS cm$^{-1}$ |
| Assuming $\phi$ = | 0.5 |
| $\sigma$ | 30.3 μS cm$^{-1}$ |

Difference(conductivity due the emulsion droplets)=23.3−30.3=−7.0 μs cm$^{-1}$.

This composition contains a large amount of component (d) and as can be seen the bulk conductivity of the emulsion is less than the theoretical value.

Example 4

| Ingredient | % |
|---|---|
| Ethoxylated (SEO) alcohol (C$_{12}$-C$_{15}$) incorporating benzalkonium chloride (50% active) at 2% w/w in surfactant | 0.24% w/v |
| Deionized water | 47% v/v |
| Butane 40 | 53% v/v |

This formulation when made up as an aerosol and sprayed though the physical valve/actuator combination described above produced a mono-polar charge on the sprayed droplets of +1.65×10$^{-4}$ C/Kg.

The same formulation was prepared substituting decane for butane in order that the conductivity could be measured.

| | |
|---|---|
| Actual (measured) conductivity of the bulk emulsion | 15.7 µS cm$^{-1}$ |
| $\sigma_c$ | 40.2 µS cm$^{-1}$ |
| $\sigma_p$ | 3.3 µS cm$^{-1}$ |
| Assuming $\phi =$ | 0.5 |
| $\sigma$ | 13.7 µS cm$^{-1}$ |

Difference (conductivity due to the emulsion droplets)= 15.7−13.7=2.0 µS cm$^{-1}$.

Examples 5-12

Formulation 1

| Ingredient | % w/w |
|---|---|
| Solvent | 5.0 |
| Fragrance component | 0.70 |
| Butylated hydroxytoluene | 0.013 |
| Polyglyceryl oleate | 0.30 |
| Deionized Water | 58.99 |
| Butane 40 | 35 |

The solvent used and the fragrance component that can be used in the above formulation are illustrated in the following Table:

| Example | Solvent | Fragrance Component | Charge/Mass (x10$^{-4}$ C/kg) |
|---|---|---|---|
| 5 | Isopar E | diethyl-o-phthalate | −2.2 |
| 6 | Isopar E | styrallyl acetate | −2.5 |
| 7 | Isopar G | α-methyl ionone | −1.9 |
| 8 | Isopar G | vanillin | −1.6 |
| 9 | heptane | Litsea Cybeba | −1.7 |
| 10 | pentane | Lilial | −2.3 |
| 11 | Isopar E | phenylethyl alcohol | −2.4 |
| 12 | Isopar L | dipropylene glycol | −2.2 |

The Isopar E, G and L range of solvents can be obtained from Exxon.
The fragrance components used were obtained from Robertet Ltd.

Examples 13-23

Formulation 2

| Ingredient | % w/w |
|---|---|
| Solvent | 5.0 |
| Aromatic component | 0.70 |
| Butylated hydroxytoluene | 0.013 |
| Polyglyceryl oleate | 0.30 |
| Deionized Water | 58.99 |
| Butane 40 | 35 |

The solvent used and the aromatic component that can be used in the above formulation are illustrated in the following Table:

| Example | Solvent | Aromatic Component | Charge/Mass (x10$^{-4}$ C/kg) |
|---|---|---|---|
| 13 | Solvesol 150 | Cleanox fragrance | −3.0 |
| 14 | Isopar E | n-butyl benzoate | −2.5 |
| 15 | Isopar L | isopropyl-4-hydroxybenzoate | −3.0 |
| 16 | Isopar E | isobutyl acetophenone | +1.6 |
| 17 | heptane | isopropyl acetophenone | +1.7 |
| 18 | pentane | benzoic acid | +1.2 |
| 19 | Isopar V | 2-naphthol | −5.3 |
| 20 | Isopar G | toluene | +1.9 |
| 21 | Pentane | neopentyl benzene | −5.9 |
| 22 | Isopar C | naphthalene | −5.4 |
| 23 | Isopar G | fullerene C60/70 | −4.5 |

Example 24

Formulation 3

| Ingredient | % |
|---|---|
| Ethoxylated (5EO) alcohol (C$_{12}$-C$_{15}$) incorporating sodium laureth sulphate (30% active) at 4% w/w in surfactant | 0.24% w/v |
| Deionized water | 47% v/v |
| Butane 40 | 53% v/v |

This formulation, when made up as an aerosol and sprayed through the physical valve/actuator combination described above produced a mono-polar charge on the sprayed droplets of −1.1×10$^{-4}$ C/kg.

The same formulation was prepared substituting decane for butane. The formulation had a $\gamma^-$ of 26.2 mJ m$^{-2}$.

An acetal 900P NC-10 insert in the spray head had a $\gamma^-$ of 15 mJ m$^{-2}$.

The difference between these Lewis base values=26.2−15=11.2 mJ m$^{-2}$.

Examples 25-50 and Comparative Examples A-C

The Table on the following pages gives the details of various formulation examples containing insecticides and/or combinations of ionic and non-ionic surfactants, with the resulting charge/mass for sprayed droplets of each formulation. As can be seen, the formulations of the Comparative Examples A, B and C produced much lower absolute values of electrostatic charge on the sprayed droplets.

| Ingredient | % w/w Example 25 | % w/w Example 26 | % w/w Example 27 | % w/w Example 28 |
|---|---|---|---|---|
| Bioallethrin | 0.194 | 0.914 | 0.194 | 0.194 |
| Bioresmethrin | 0.036 | 0.036 | 0.036 | 0.036 |
| BHT | 0.02 | 0.02 | 0.02 | 0.02 |
| Polyglycerol oleate | 0.900 | 0.900 | 0.900 | 0.900 |
| Oleic acid | 0.09 | 0.180 | 0.045 | 0.023 |
| Perfume | 0.100 | 0.100 | 0.100 | 0.100 |
| Norpar 13 | 7.500 | 7.500 | 7.500 | 7.500 |
| Deionised water | 51.16 | 51.07 | 51.205 | 51.227 |
| H55 | 40.000 | 40.000 | 40.000 | 40.000 |
| Charge/mass (x10$^{-4}$ C/kg) | −0.75 | −0.72 | −0.63 | −0.90 |

-continued

| Ingredient | % w/w Example 29 | % w/w Example 30 | % w/w Example 31 | % w/w Example 32 |
|---|---|---|---|---|
| Teric 12A2 | 0.800 | 1.000 | 0.800 | 0.700 |
| Oleic acid | 0.400 | 0.400 | 0.400 | 0.400 |
| Norpar 13 | 7.500 | 7.500 | 7.500 | 7.500 |
| Deionised water | 51.300 | 51.100 | 51.300 | 51.400 |
| H55 | 40.000 | 40.000 | 40.000 | 40.000 |
| Charge/mass ($\times 10^{-4}$ C/kg) | −1.02 | −0.68 | −0.816 | −0.816 |

| Ingredient | % w/w Example 33 | % w/w Example 34 | % w/w Example 35 |
|---|---|---|---|
| Teric 12A2 | 0.600 | 0.500 | 1.000 |
| Oleic acid | 0.400 | 0.400 | 0.200 |
| Norpar 13 | 7.500 | 7.500 | 7.500 |
| Deionised water | 51.500 | 51.600 | 51.300 |
| H55 | 40.000 | 40.000 | 40.000 |
| Charge/mass ($\times 10^{-4}$ C/kg) | −1.596 | −0.966 | −1.53 |

| Ingredient | % w/w Example 36 | % w/w Example 37 |
|---|---|---|
| Teric 12A2 | 1.000 | 1.000 |
| Oleic acid | 0.400 | 0.800 |
| Perfume | 0.100 | 0.100 |
| Norpar 13 | 7.500 | 7.500 |
| Deionised water | 51.100 | 50.700 |
| H55 | 40.000 | 40.000 |
| Charge/mass ($\times 10^{-4}$ C/kg) | −0.57 | −0.738 |

| Ingredient | % w/w Example 38 | % w/w Example 39 | % w/w Example 40 |
|---|---|---|---|
| Teric 12A2 | 1.000 | 1.000 | 1.000 |
| Lauric acid | 0.100 | 0.200 | 0.400 |
| Norpar 13 | 7.500 | 7.500 | 7.500 |
| Deionised water | 51.400 | 51.300 | 51.100 |
| H55 | 40.000 | 40.000 | 40.000 |
| Charge/mass ($\times 10^{-4}$ C/kg) | −0.532 | −0.578 | −0.574 |

| Ingredient | % w/w Example 41 | % w/w Example 42 |
|---|---|---|
| Teric 12A2 | 1.000 | 1.000 |
| Palmitic acid | 0.010 | 0.020 |
| Norpar 13 | 7.500 | 7.500 |
| Deionised water | 51.400 | 51.300 |
| H55 | 40.000 | 40.000 |
| Charge/mass ($\times 10^{-4}$ C/kg) | −0.502 | −0.704 |

| Ingredient | % w/w Example 43 | % w/w Example 44 | % w/w Example 45 | % w/w Example 46 |
|---|---|---|---|---|
| Teric 12A2 | 0.700 | 0.720 | 0.700 | 0.700 |
| Oleic acid | 0.500 | 0.400 | 0.400 | 0.400 |
| Norpar 13 | 7.500 | 7.500 | 7.500 | 7.500 |
| Deionised water | 41.300 | 31.38 | 51.400 | 51.300 |
| H55 | — | — | — | 40.000 |
| H46 | 50.000 | 60.000 | 40.000 | — |
| Charge/mass ($\times 10^{-4}$ C/kg) | −1.39 | −2.12 | −0.71 | −1.65 |

| Ingredient | % w/w Example 47 |
|---|---|
| Teric 17A2 | 0.85 |
| Oleic acid | 0.35 |
| Norpar 13 | 5.00 |
| Deionised water | 33.80 |
| H46 | 60.000 |
| Charge/mass ($\times 10^{-4}$ C/kg) | −4.8 |

| Ingredient | % w/w Example 48 | % w/w Example 49 |
|---|---|---|
| Norpar 13 | 5.00 | 5.00 |
| Bioallethrin | 0.25 | 0.25 |
| Bioresmethrin | 0.05 | 0.05 |
| BHT | 0.02 | 0.02 |
| Deionised water | 33.28 | 33.58 |
| Teric 17A3 | 0.60 | 0.35 |
| Crill 45 | 0.40 | 0.35 |
| Pine Fragrance | 0.10 | 0.10 |
| Oleic acid | 0.30 | 0.30 |
| H46 | 60.00 | 60.00 |
| Charge/mass ($\times 10^{-4}$ C/kg) | −1.41 | −1.34 |

| Ingredient | % w/w Example 50 |
|---|---|
| Bioallethrin | 0.209 |
| Bioresmethrin | 0.039 |
| BHT | 0.005 |
| Polyglycerol oleate (containing from 0.01 to 1% by weight of sodium or potassium oleate) | 0.900 |
| Perfume | 0.100 |
| Norpar 13 | 7.500 |
| Deionised water | 51.247 |
| H55 | 40.000 |
| Charge/mass ($\times 10^{-4}$ C/kg) | −1.59 |

| Ingredient | Comparative Example A | Comparative Example B | Comparative Example C |
|---|---|---|---|
| Teric 12A2 | — | 1.000 | 1.000 |
| Bioallethrin | 0.194 | — | — |
| Bioresmethrin | 0.036 | — | — |
| BHT | 0.02 | — | — |
| Polyglycerol oleate | 0.900 | — | — |
| Perfume | 0.100 | — | — |
| Norpar 13 | 7.500 | 7.500 | 7.500 |
| Deionised water | 51.25 | 51.50 | 51.500 |
| H55 | 40.000 | 40.000 | 40.000 |
| Crill 45 | 0.40 | 0.35 | |
| Charge/mass ($\times 10^{-4}$ C/kg) | −0.35 | +0.21 | −0.017 |

Examples 51 to 61

The following Table provides details of compositions in which the amount of oleic acid, sodium oleate or a mixture of oleic acid and sodium oleate contained in the compositions is varied.

These formulations were sprayed through the physical valve/activator combination described above and the monopolar charges on the sprayed droplets were recorded.

The Lewis acid and base values for the compositions were also recorded. The Lewis base value of the Acetal 900P NC-10 insert material through which the compositions were sprayed was 15 mJ m$^{-2}$. The Lewis acid value of the Acetal 900P NC-10 insert material through which the compositions were sprayed was 0 mJ m$^{-2}$.

Values are also given for the theoretical conductivity and bulk conductivity of each of the formulations.

| Components % w/w | Example No | | | | |
|---|---|---|---|---|---|
| | 51 | 52 | 53 | 54 | 55 |
| Deionized water | 59.0759 | 59.0730 | 59.0585 | 59.0730 | 59.0585 |
| Fragrance Cleanox | 0.2470 | 0.2470 | 0.2470 | 0.2470 | 0.2470 |
| Isopar G | 4.9985 | 4.9985 | 4.9985 | 4.9985 | 4.9985 |
| Columed MBQ Crestor L(PGO) - Croda | 0.5785 | 0.5785 | 0.5785 | 0.5785 | 0.5785 |
| Na Oleate | — | 0.0029 | 0.0174 | — | — |
| Oleic Acid | — | — | — | 0.0029 | 0.0174 |

-continued

| | | | | | | |
|---|---|---|---|---|---|---|
| Lewis base value $\gamma^-$ (mJ m$^{-2}$) | 20.0 | 17.5 | 40.0 | 50.0 | 60.0 | 17.5 |
| Lewis acid value $\gamma^+$ (mJ m$^{-2}$) | 2.5 | 2.0 | 1.0 | 1.0 | 1.0 | 5.0 |
| Theoretical Conductivity (μS cm$^{-1}$) | 2.92 | — | 5.16 | 3.16 | 10.72 | — |
| Bulk Conductivity (μS cm$^{-1}$) | 8.93 | — | 16.56 | 17.86 | 18.52 | — |

Example 62 to 68

The following Table provides details of compositions in which an aromatic dopant is added to the formulation of Example 51, but the purity of the surfactant was slightly different.

| Example No. | Aromatic Dopant | Conc$^n$ | $\gamma^-$ (mJ m$^{-2}$) | $\gamma^+$ (mJ m$^{-2}$) | Charge/Mass ($\times 10^{-4}$ C/kg) |
|---|---|---|---|---|---|
| 62 | resorcinol | 1.00* | 25.0 | 2.5 | −2.77 |
| 63 | 2-methoxy cinnam-aldehyde | 1.00* | 22.5 | 2.5 | −2.50 |
| 64 | arbutin | 1.00* | 45.0 | 2.5 | −2.27 |
| 65 | esculetin | 1.00* | 35.0 | 2.5 | −2.07 |
| 66 | trans-stilbene | 1.00* | 20.0 | 2.5 | −1.86 |
| 67 | 4-isopropoxy phenol | 1.00* | 20.0 | 2.5 | −2.86 |
| 68 | 4-acetoxy-3-methoxy cinnam-aldehyde | 0.22** | 20.0 | 2.5 | −2.53 |

*Concentration in columned MBQ Creston L (PGO) - Croda
**Concentration in final formulation -continued

| | | | | | |
|---|---|---|---|---|---|
| BHT | 0.1001 | 0.1001 | 0.1001 | 0.1001 | — |
| Butane 40 | 5.0000 | 35.0000 | 35.0000 | 35.0000 | 35.0000 |
| Charge/Mass ($\times 10^{-4}$ C/Kg) | −2.08 | −2.05 | −0.72 | −1.64 | −1.40 |
| Lewis base value $\gamma^-$ (mJ m$^{-2}$) | 19.2 | 12.0 | 17.0 | 26.0 | 17.5 |
| Lewis acid value $\gamma^+$ (mJ m$^{-2}$) | 2.0 | 3.0 | 1.0 | 1.0 | 2.5 |
| Theoretical Conductivity (μS cm$^{-1}$) | — | — | 3.87 | 2.63 | 2.47 |
| Bulk Conductivity (μS cm$^{-1}$) | — | — | 4.55 | 3.33 | 2.63 |

| Components % w/w | Example No | | | | | |
|---|---|---|---|---|---|---|
| | 56 | 57 | 58 | 59 | 60 | 61 |
| Deionized water | 59.0747 | 59.0701 | 59.0641 | 59.0411 | 59.0556 | 59.0556 |
| Fragrance Cleanox | 0.2470 | 0.2470 | 0.2470 | 0.2470 | 0.2470 | 0.2470 |
| Isopar G | 4.9985 | 4.9985 | 4.9985 | 4.9985 | 4.9985 | 4.9985 |
| Columed MBQ Crestor L(PGO) - Croda | 0.5785 | 0.5785 | 0.5785 | 0.5785 | 0.5785 | 0.5785 |
| Na Oleate | 0.0006 | 0.0029 | 0.0059 | 0.0174 | 0.0174 | 0.0029 |
| Oleic Acid | 0.0006 | 0.0029 | 0.0059 | 0.0174 | 0.0029 | 0.0174 |
| BHT | 0.1001 | 0.1001 | 0.1001 | 0.1001 | 0.1001 | 0.1001 |
| Butane 40 | 35.0000 | 35.0000 | 35.0000 | 35.0000 | 35.0000 | 35.0000 |
| Charge/Mass ($\times 10^{-4}$ C/Kg) | −2.30 | −0.89 | −0.75 | −0.70 | −0.74 | −1.89 |

| Ingredients and Availability | |
|---|---|
| Oleic acid[1] | Technical (Croda Chemicals) |
| Lauric acid[1] | Reagent Grade (BDH) |
| Palmitic acid[1] | Reagent Grade (BDH) |
| Teric 17A3[2] | $C_{17}$ alcohol with 3 moles of ethylene oxide (Orica) |
| Teric 17A2[2] | $C_{17}$ alcohol with 2 moles of ethylene oxide (Orica) |
| Teric 12A2[2] | $C_{12}$ alcohol with 2 moles of ethylene oxide (Orica) |
| Crill 45[2] | Sorbitan trioleate (Orica) |
| Polyglycerol oleate[2] | Croda Chemicals |
| BHT[4] | Butylated hydroxytoluene (Orica) |
| Norpar 13[5] | liquid n-paraffin (Exxon) |
| Bioallethrin[3] | 93% w/w (Agrevo) |
| Bioresmethrin[3] | 93% w/w (Agrevo) |
| H46[6] | 16% w/w propane/butane blend (Boral) |
| H55[6] | 26% w/w propane/butane blend (Boral) |

Key::
[1]Ionic Compound (d)
[2]Non-ionic surfactant
[3]Insecticide
[4]Antioxidant
[5]Solvent
[6]Propellant It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of enhancing the unipolar charge which is imparted to droplets of an emulsion on discharge from an aerosol spray device, the method comprising forming the droplets from an oil-in-water or a water-in-oil emulsion composition which comprises:
   - (a) at least one propellant in an amount of about 10% to about 60% w/w,
   - (b) at least one non-ionic alkoxylated alcohol surfactant in an amount of from about 0.01 to about 1.0% w/w,
   - (c) optionally at least one solvent within an oil phase of the emulsion in an amount of up to about 20% w/w, said solvent being selected from the group consisting of n-paraffins and isoparaffins,
   - (d) a component in an amount of from about 0.01 to about 10% w/w of the non-ionic surfactant present in the composition, said component being selected from the group consisting of benzalkonium chloride, sodium laureth sulphate and oleic acid in an amount such that a theoretical conductivity of the emulsion is less than a bulk conductivity of the emulsion and the difference is at least about 0.5 μS $cm^{-1}$, and
   - (e) water.

2. A method of enhancing the unipolar charge which is imparted to droplets of an emulsion on discharge from an aerosol spray device, the method comprising forming the droplets from an oil-in-water or a water-in-oil emulsion composition which comprises:
   - (a) at least one propellant in an amount of about 10% to about 60% w/w,
   - (b) polyglycerol oleate in an amount of from about 0.01 to about 1.0% w/w,
   - (c) at least one solvent within an oil phase of the emulsion in an amount of up to about 20% w/w, said solvent being selected from the group consisting of n-paraffins and isoparaffins,
   - (d) a component in an amount of from about 0.01 to about 10% w/w of the polyglycerol oleate present in the composition, said component being selected from the group consisting of oleic acid, sodium oleate, potassium oleate and mixtures thereof in an amount such that a theoretical conductivity of the emulsion is less than a bulk conductivity of the emulsion and the difference is at least about 0.5 μS $cm^{-1}$, and
   - (e) water.

3. The method according to claims 1 or 2 wherein the difference between the theoretical conductivity of the emulsion and the bulk conductivity of the emulsion is at least about 4 μS $cm^{-1}$.

4. The method according to claim 3 wherein the difference between the theoretical conductivity of the emulsion and the bulk conductivity of the emulsion is at least about 6 μS $cm^{-1}$.

5. The method according to claims 1 or 2 wherein at least about 90% by volume of the droplets of the disperse phase within the emulsion have an average diameter of less than about 60 μm.

6. The method according to claim 5 wherein at least about 90% by volume of the droplets of the disperse phase within the emulsion have an average diameter in a range of about 20 to about 40 μm.

7. The method according to claims 1 or 2 wherein the droplets formed on discharge from an aerosol spray device have a charge to mass ratio of at least about $+/-1\times10^{-4}$ C/kg.

8. The method according to claim 7 wherein the droplets formed on discharge from an aerosol spray device have a charge to mass ratio of at least about $+/-2\times10^{-4}$ C/kg.

9. The method according to claims 1 or 2 in which the composition is an insecticidal composition that contains at least one insecticide in an amount of about 0.001% to about 5% w/w.

10. The method according to claim 1 wherein (b) the non-ionic surfactant is a $C_{12}$-$C_{15}$ alcohol ethoxylated with 5 moles of ethylene oxide, and (d) the component is benzalkonium chloride or sodium laureth sulphate.

11. A method of enhancing the electrostatic charge imparted to droplets of a composition in a form of a water-in-oil or an oil-in-water emulsion on discharge from an aerosol spray device in which the composition includes:
   - (a) at least one propellant in an amount of about boo to about 60% w/w,
   - (c) optionally at least one solvent within an oil phase of the emulsion in an amount of up to about 20% w/w, said solvent being selected from the group consisting of n-paraffins and isoparaffins, and
   - (e) water, the method comprising mixing with (a), (c) and (e) a non-ionic alkoxylated alcohol surfactant in an amount of from about 0.01 to about 1.0% w/w and a component in an amount of from about 0.01 to about boo w/w of the non-ionic alkoxylated alcohol surfactant, said component being selected from the group consisting of benzalkonium chloride, sodium laureth sulphate and oleic acid, the amount of the component being such that a theoretical conductivity of the emulsion is less than a bulk conductivity of the emulsion.

12. A method of enhancing the electrostatic charge imparted to droplets of a composition in a form of a water-in-oil or an oil-in-water emulsion on discharge from an aerosol spray device in which the composition includes:
   - (a) at least one propellant in an amount of about 10% to about 60% w/w,
   - (c) at least one solvent within an oil phase of the emulsion in an amount of up to about 20% w/w, said solvent being selected from the group consisting of n-paraffins and isoparaffins, and
   - (e) water, the method comprising mixing with the (a), (c) and (e) polyglycerol oleate in an amount of from about 0.01 to about 1.0% w/w and a component in an amount of from about 0.01 to about 10% w/w of the polyglycerol oleate, said component being selected from the group consisting of oleic acid, sodium oleate, potassium oleate and mixtures thereof, the amount of the component being such that a theoretical conductivity of the emulsion is less than a bulk conductivity of the emulsion.

* * * * *